Nov. 15, 1960 E. A. OHM 2,960,671

ELECTROMAGNETIC WAVE TRANSDUCER

Filed Jan. 26, 1956 2 Sheets-Sheet 1

INVENTOR
E. A. OHM
BY Roy M. Porter, Jr.
ATTORNEY

Nov. 15, 1960 E. A. OHM 2,960,671

ELECTROMAGNETIC WAVE TRANSDUCER

Filed Jan. 26, 1956 2 Sheets-Sheet 2

INVENTOR
E. A. OHM
BY Roy M. Porter, Jr.
ATTORNEY

United States Patent Office 2,960,671

Patented Nov. 15, 1960

2,960,671

ELECTROMAGNETIC WAVE TRANSDUCER

Edward A. Ohm, Red Bank, N.J., assignor to Bell Telephone Laboratories, Incorporated, New York, N.Y., a corporation of New York Filed Jan. 26, 1956, Ser. No. 561,532

2 Claims. (Cl. 333—35)

This invention relates to electromagnetic wave transmission systems and, more particularly, to transducers or transformers for coupling wave energy from one conductively bounded wave guide of one characteristic impedance and cross section to another of different impedance and/or cross section.

It is familiar practice in the electromagnetic wave transmission art to connect two wave guides of different characteristic impedances or sizes by one or more transition sections of wave guide each of which is substantially one-quarter wavelength long and has a size or characteristic impedance between the connected guide sizes or impedances. The resulting dimensional discontinuity is referred to as a "step." Such a transformer is usually stepped in its narrow or electric plane dimension when the guides to be connected have equal widths and it is stepped in its wide or magnetic plane dimension when the guides have equal heights. If the aspect ratios, i.e., the ratio of the wide to the narrow dimension, of the guides to be connected are similar so that the impedance difference between them is small and it is primarily a matter of matching their sizes, the transformer may be stepped in both the electric and magnetic planes.

It is also well known that while such a transformer will effectively match the resistive characteristic impedance of the guides, it will itself introduce a reactive discontinuity to the system. This discontinuity appears as a reactance connected across the system at the two ends of each quarter wave section. In prior practice, if the aspect ratios of the guides are similar so that their impedances are similar, this reactance is often neglected. But if the impedance difference between the guides is substantial, a corresponding reactance of the opposite sign must be added at the ends of the transformer. This reactance, however, unduly limits the bandwidth of the system.

It is therefore an object of the present invention to couple wave guides of large impedance differences for broad frequency bands of wave energy transmission.

It is a further object to couple wave guides of substantially different electric and magnetic plane dimensions for broad bands of wave energy transmission.

It is a more specific object to couple wave guides of large impedance differences and different aspect ratios, and particularly, guides for which the electric and magnetic plane dimensions of one are larger and smaller, respectively, than the corresponding parallel dimensions of the other.

In accordance with the present invention, a transition section is stepped simultaneously in the wide and narrow dimensions. The steps are taken in opposite directions so that the step in the wide dimension produces an inductive shunt susceptance that is substantially equal in magnitude to and therefore cancels with the capacitive shunt susceptance produced by the step in the narrow dimension. Since the parameters associated with each step are not readily susceptible to direct calculation, a special feature of the invention resides in the method by which these parameters may be proportioned to obtain the desired result. At the same time, the ratio between the wide and narrow dimensions of the transformer section is proportioned to provide it with a characteristic impedance related to the characteristic impedance of the guides to be matched according to prior art proportions.

Inasmuch as the transformer in accordance with the present invention is capable of matching guides of large impedance differences, it is particularly suitable for matching guides of substantially different aspect ratios and therefore of widely different impedances. In particular, a feature of the present invention resides in its use to couple a guide of circular cross section with one of rectangular cross section.

These and other objects and features of the invention, and nature of the present invention and its various advantages, will appear more fully upon consideration of the accompanying drawings and the following detailed description of these drawings.

Figures 1, 3:
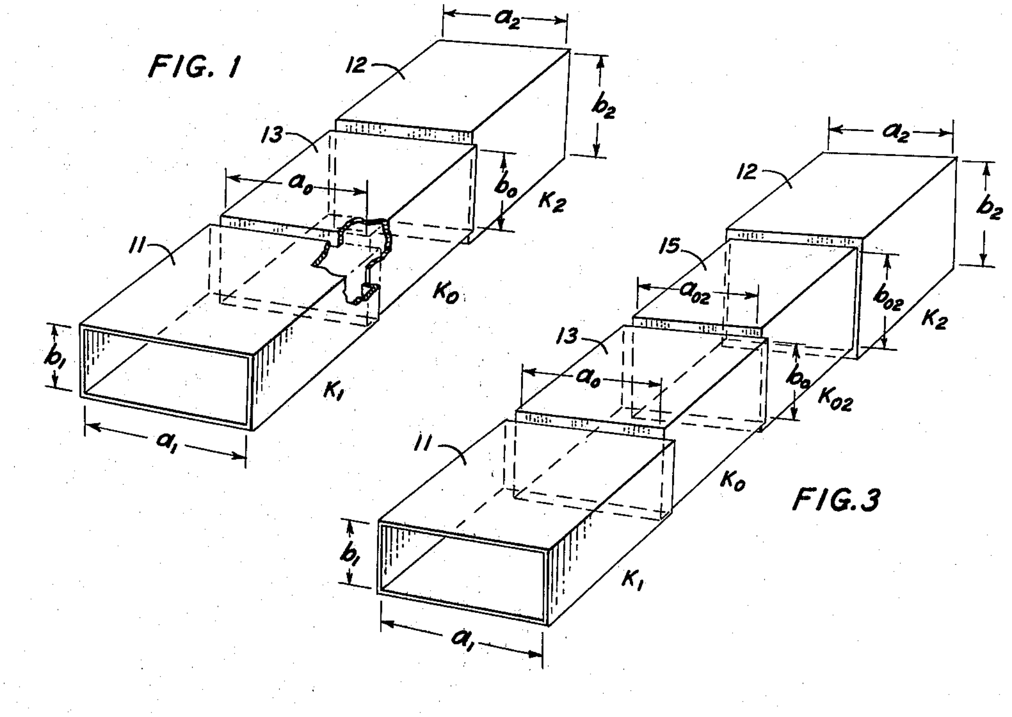
Fig. 1 is a perspective view of two rectangular wave guides interconnected by a transformer section in accordance with the invention.
Fig. 3 is a perspective view representing a modification of the embodiment of Fig. 1.

Referring more particularly to Fig. 1, an embodiment of the invention is shown illustrating, by way of example, how rectangular wave guides of different aspect ratios may be connected. Guide 11 represents a first conductively bounded rectangular wave guide of convenient dimensions having a wide or magnetic plane dimension $a_1$ conventionally greater than one-half of the guide wavelength and less than one guide wavelength of the wave energy to be conducted thereby, and a narrow or electric plane dimension $b_1$ approximately one-half of $a_1$. Guide 11 has a characteristic impedance $K_1$ determined by the dimensions of the guide according to the familiar relation $$K_1=\frac{754b_1}{a_1\sqrt{1-\left(\frac{\lambda_0}{2a_1}\right)^2}} \quad (1)$$

in which $\lambda_0$ is the midband free space wavelength of the energy to be conducted thereby. Guide 12 represents a second conductively bounded rectangular wave guide which, for the purpose of explanation, has a smaller aspect ratio than guide 11 with a wide dimension $a_2$ smaller than $a_1$ and a narrow dimension $b_2$ larger than $b_1$. However, as will be discussed hereinafter, the principles of the invention are applicable to guides of other relative sizes and aspect ratios. Guide 12 has an impedance $K_2$ substantially different from $K_1$ determined by its cross-sectional dimensions according to a relation similar to Equation 1.

Guides 11 and 12 are connected together and matched by a transformer section of rectangular conductively bounded wave guide 13 having a wide dimension $a_0$, a narrow dimension $b_0$, a length measured in the direction of propagation of substantially one-quarter wavelength, and a characteristic impedance $K_0$ determined by $$K_0=\frac{754b_0}{a_0\sqrt{1-\left(\frac{\lambda_0}{2a_0}\right)^2}} \quad (2)$$

The use of quarter wave transformers in general is quite familiar to the art and it is known that if the characteristic impedance $K_0$ is chosen to be a value between $K_1$ and $K_2$ so that $K_0/K_1$ is greater than unity and less than $K_2/K_1$, then the resistive characteristic impedance of the connected guides will be matched since components reflected from each discontinuity will have appropriate phases and amplitudes to cancel with each other in either of the guides. More particularly, in the case of the single quarter wave transformer section as employed in Fig. 1, the value of $K_0$ should be the mean between $K_1$ and $K_2$ determined by the relation $$K_0=\sqrt{K_1K_2} \qquad (3)$$

For further theory and details reference is made to "Principles and Applications of Wave Guide Transmission," G. C. Southworth, D. Van Nostrand Co. 1950, chapter IX.

As may be seen from Equation 2 there are an infinite set of values for $a_0$ and $b_0$ that will result in a given impedance $K_0$. In accordance with the present invention, the dimensions $a_0$ and $b_0$ of guide 13 each bear a specific ratio to $a_1$ and $b_1$ of guide 11, respectively, so that guide 13 forms a nonsusceptive junction with guide 11, i.e., a junction for which the impedance discontinuity is entirely real or resistive. More particularly, guide 13 is smaller in one dimension and larger in the other dimension by specified ratios to the corresponding dimensions of guide 11 so that the inductive shunt susceptance produced by the discontinuity in the wide dimension is substantially equal to and therefore in canceling relationship with the capacitive shunt susceptance produced by the dimension discontinuity in the narrow dimension. In the particular embodiment illustrated in Fig. 1, $a_0$ is smaller than $a_1$ and $b_0$ is larger than $b_1$. The specific amounts of said difference are not readily obtainable by direct calculation even after making numerous simplifying assumptions because of the unwieldy composition of the analytical expressions defining the simultaneously produced inductive and capacitive susceptances. However, by particular adaptations of graphical methods familiar to the filter art, applicant has derived an empirical expression, which has been verified by numerous physical embodiments, to define the locus of the dimensional ratios producing nonsusceptive junctions between two or more guides.

Figure 2:
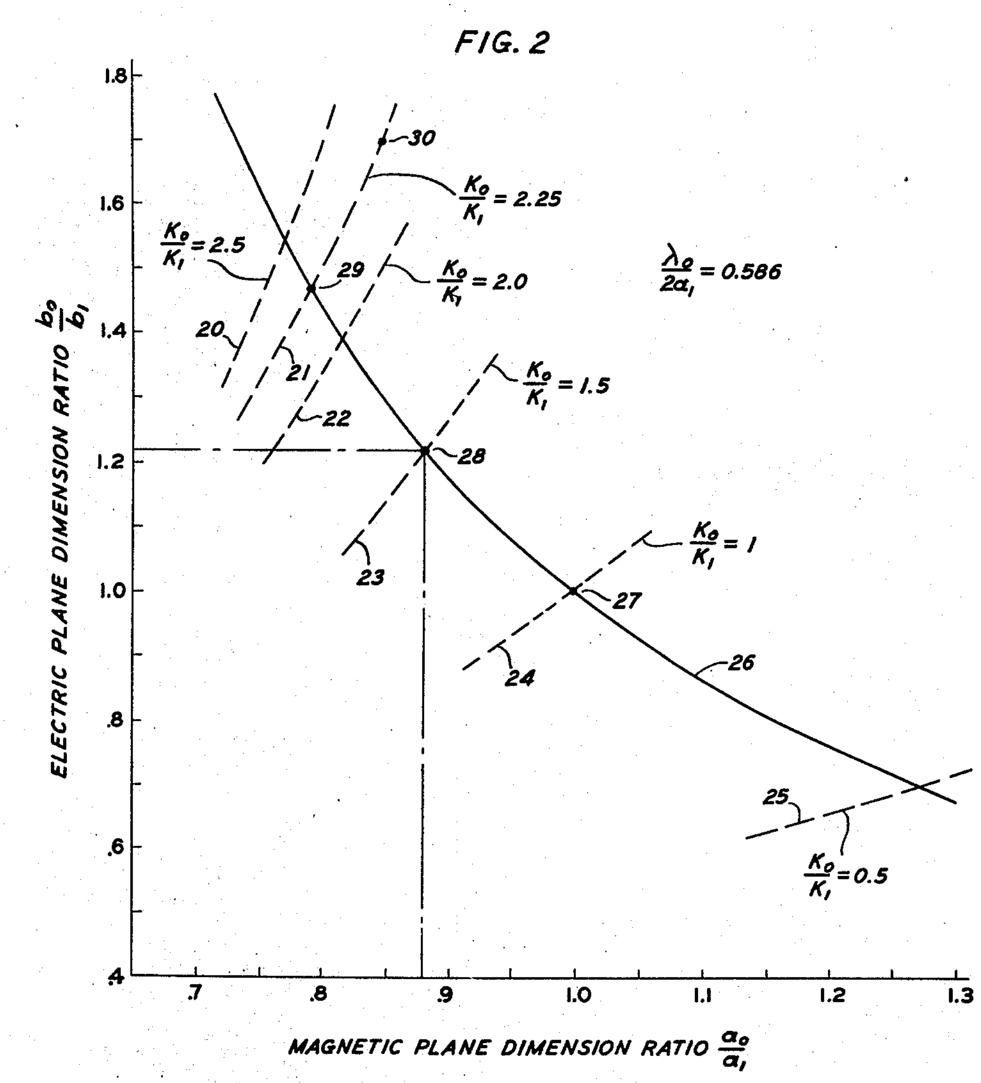
Fig. 2 shows typical characteristics from which the dimensional ratios of the transformer section of Fig. 1 are determined.

Referring, therefore, to Fig. 2, the results of applicant's analysis are represented by characteristics having an abscissa representing the magnetic plane dimension ratio $a_0/a_1$ and an ordinate representing the electric plane dimension ratio $b_0/b_1$. Characteristics 20 through 25 are the loci of wave guide dimensions ratios, being functions of $a_0/a_1$ and $b_0/b_1$, that produce given characteristic impedance ratios such as 0.5, 1, 1.5, 2, 2.25 and 2.5. Each curve is the plot of Equation 2 divided by Equation 1 and solved for the electric plane dimension ratio as follows:

$$\frac{b_0}{b_1}=\frac{K_0}{K_1}\left[\frac{\left(\frac{a_0}{a_1}\right)^2-\left(\frac{\lambda_0}{2a_1}\right)^2}{1-\left(\frac{\lambda_0}{2a_1}\right)^2}\right]^{1/2} \qquad (4)$$

Generally defined, these curves have positive slopes since as the ratio $a_0/a_1$ increases, the ratio $b_0/b_1$ increases. Curve 24 represents the special case which passes through point 27 having the coordinates $$\frac{b_0}{b_1}=\frac{a_0}{a_1}=1$$

and representing the reference condition for which the guides have equal cross-sectional dimensions and therefore identical impedances.

Characteristic 26 represents the locus of dimension ratios for wave guides that produce substantially nonsusceptive junctions with each other and is the plot of the empirical relation $$\frac{b_0}{b_1}=\frac{a_1}{a_0}-1+\left[\frac{1-\left(\frac{\lambda_0}{2a_1}\right)^2}{1-\left(\frac{\lambda_0}{2a_1}\right)^2\left(\frac{a_1}{a_0}\right)^2}\right]^{1/2} \qquad (5)$$

Generally defined, curve 26 passes through the point 27 with a generally negative slope, i.e., opposite to that of curves 20 through 25. As the ratio $a_0/a_1$ increases, the ratio $b_0/b_1$ decreases so that the successive changes in the narrow and wide dimensions are in generally inverse relationship to each other although not necessarily reciprocals of each other. This carries curve 26 through the second or upper left-hand quadrant and the fourth or lower right-hand quadrant about the point 27. All curves shown on Fig. 2 are specifically evaluated for the ratio $$\frac{\lambda_0}{2a}=0.586$$

a ratio of the midband free space wavelength to guide cutoff that is often employed in commercial wave guide practice. A similar evaluation for other ratios of $\lambda_0/2a$ will have the effect of changing the slopes of the curves slightly without invalidating any of the above-defined general qualifications.

Applying the curves of Fig. 2 to the specific embodiment of Fig. 1, the dimensions $a_1$, $b_1$, $a_2$, $b_2$ and the characteristic impedances $K_1$ and $K_2$ of guides 11 and 12 are assumed to be fixed by other considerations. The impedance $K_0$ of transition guide 13 is then determined by Equation 3. The ratio of $K_0/K_1$ is then located on Fig. 2. Assuming $$\frac{K_0}{K_1}=1.5$$

the ratio is represented by curve 23 which gives every magnetic plane dimension ratio and the corresponding electric plane dimension ratio between any two rectangular guides that will produce a characteristic impedance ratio between them of 1.5. The intersection 28 of curve 23 with curve 26 represents the simultaneous solution of Equations 4 and 5. The coordinates of point 28 show that $b_0$ of transition guide 13 must be substantially equal to $1.22b_1$ and that $a_0$ be equal to about $.88a_1$. Thus for the impedance ratio $K_0/K_1$ the magnetic plane dimension discontinuity between guides 11 and 13 will introduce a shunt susceptance substantially equal in magnitude and opposite in sign to the susceptance introduced by the electric plane dimension discontinuity.

The preceding proportions automatically determine the dimension of the discontinuity between guides 12 and 13, and while this discontinuity is not necessarily entirely nonsusceptive, the inductive shunt susceptance introduced by the difference between $a_0$ and $a_2$ will tend to cancel with the capacitive shunt susceptance introduced by the difference between $b_0$ and $b_2$. In practice, when guide 12 is the smallest in one dimension and largest in the other dimension, it has been found that the residual susceptance is usually small and is always very much smaller than the susceptance produced by prior art arrangements. In practice it may be neglected or compensated for by a longitudinal change of guide 13 or a low Q iris at the junction of guides 12 and 13.

An alternate approach can be used to avoid compensation techniques and this is especially attractive when the metallic discontinuity at the junction of guides 12 and 13 is appreciable. This is accomplished by introducing a further transition section at the junction of guides 12 and 13 which has the same characteristic impedance as guide 12 and which forms a nonsusceptive junction with both guides 13 and 12. Referring to Fig. 3, the combination of guide sections shown in Fig. 1 is reproduced with corresponding reference numerals designating corresponding components. An additional section 15 of conductively bounded rectangular guide having a wide dimension $a_{02}$ and a narrow dimension $b_{02}$ is interposed between guides 12 and 13. Guide 15 has a characteristic impedance $K_{02}$ that is numerically equal to the characteristic impedance $K_2$ of guide 12.

For specific example, assume that the predetermined dimensions of guide 12 are those represented by point 30 on Fig. 2, considerably removed from locus 26, and that the impedance $K_2$ of guide 12 is 2.25 times that of guide 11. Such a ratio is represented by the impedance curve 21 on Fig. 2. The transition from the cross section represented by point 30 is then made at a constant impedance along curve 21 to the cross section of guide 15, represented on Fig. 2 by point 29 at the intersection of curve 21 with locus 26. It is shown on page 265 of Southworth that this type of junction is not unlike that of a resonant iris described by Equation 8.5–4 on page 254 of Southworth. Thus the junction of the cross sections represented by points 30 and 29 is automatically nonsusceptive because curve 21 is plotted from Equation 4 and Equation 4 is identical to Equation 8.5–4 when Equation 4 is normalized to its own impedance level and its dimensions are normalized to the dimensions of any point located on its own impedance locus. Thus point 29 defines the dimensions of guide 15, for example $a_{02}$ equal $0.78a_1$ and $b_{02}$ equal $1.47b_1$, which produce an impedance equal to $K_2$ and form nonsusceptive junctions with guides 11 and 12. Since it is axiomatic that if two guides from nonsusceptive junctions with a third guide they will form nonsusceptive junctions with each other, the junction between guides 13 and 15 will be nonsusceptive.

It should be noted that the embodiments of Figs. 1 and 3 illustrate the invention as applied to connecting a rectangular wave guide to one of smaller width and greater height. It may also be applied to connecting to one of greater width and smaller height. Furthermore, there appears to be no serious limitation within the limits that may be encountered in practice upon the impedance difference that can be matched.

Figures 4, 5:
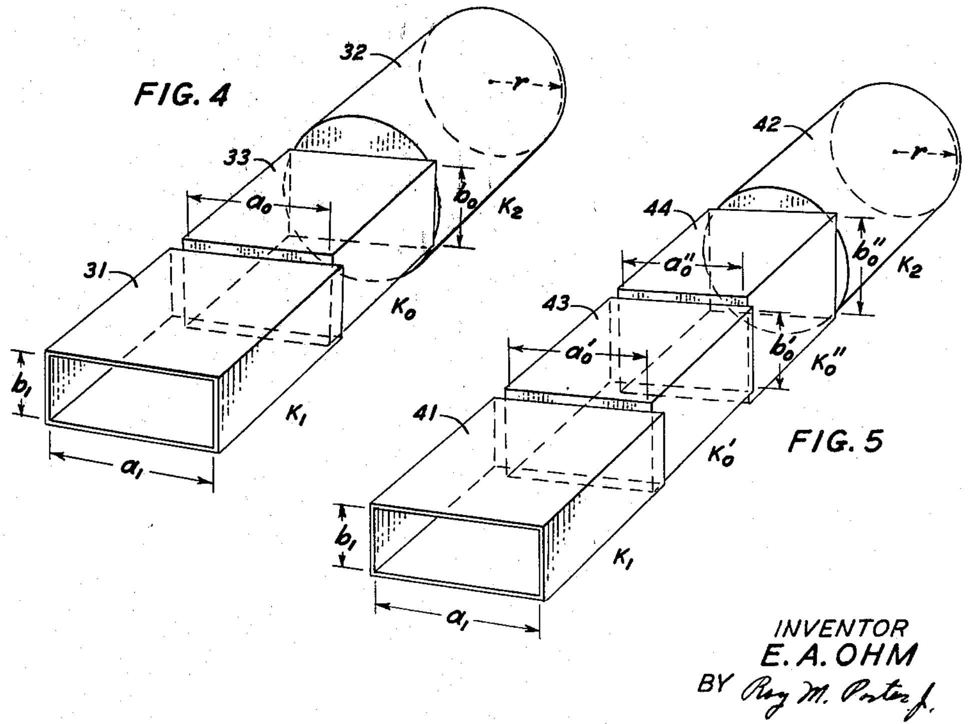
Fig. 4 is a perspective view representing a particular use of the invention in connection with the guide of circular cross section.
Fig. 5 illustrates how a plurality of transformer sections in accordance with the invention may be employed.

Fig. 4 illustrates how the principles of the invention may be applied to connecting guides of different geometrical cross sections and, more particularly, one of rectangular cross section to one of circular cross section. Such a junction presents a serious matching problem since in practice the commonly used relative dimensions of the guides result in an impedance for the circular guide that is often more than three times that of the rectangular guide. Furthermore, considering the circular guide as one having an aspect ratio of unity with equal electric and magnetic plane dimensions, its aspect ratio is substantially different from that of a conventional rectangular wave guide. Thus the present invention is particularly suited for connecting the two since it provides a transition structure that can match wide impedance differences and has at the same time a cross-sectional shape that forms a low Q and broad band junction with a circular guide. The importance of this aspect of the invention will be understood upon recognition of the fact that even though the inductive and capacitive susceptances at a junction are equal, they result in increasing the Q at the junction and decreasing its bandwidth in proportion to their magnitudes. Therefore a preferred rectangular transition section for juncture with a guide of circular cross section is one that makes a minimum of physical discontinuity with the circular guide, resulting in the lowest possible Q, and at the same time most nearly producing a nonsusceptive junction with the circular guide.

Referring to Fig. 4, a rectangular wave guide 31 is shown having $a_1$ and $b_1$ wide and narrow dimensions, respectively, and a characteristic impedance $K_1$. Guide 31 is to be connected and matched to a conductively bounded guide 32 of circular cross section having a radius $r$ and a characteristic impedance $K_2$. The transition between guides 31 and 32 is provided by a quarter wavelength section of conductively bounded guide 33 having the $a_0$ and $b_0$ dimensions thereof chosen in substantially the manner set forth in connection with Fig. 1. Thus the impedance $K_0$ of section 33 is the mean impedance between $K_1$ and $K_2$. The dimension $a_0$ is smaller than $a_1$ and $b_0$ larger than $b_1$ by ratios determined from Fig. 3 by the intersection of the particular $K_0/K_1$ characteristic with the nonsusceptive locus 26 so that for the particular impedance ratio between guides 31 and 33, a nonsusceptive junction is produced between them. The dimensions of the junction between guides 32 and 33 is automatically determined by this proportion and may introduce a residual amount of susceptance unless the dimensions of either guides 31 or 32 are subject to initial selection. In any event, since the resulting dimensions of guide 33 approach those of a guide that would make the minimum physical discontinuity with guide 32, the susceptive discontinuity between them is small and may be equalized in any well known manner. Guide 32 need not be of precise circular cross section but may, as well be ovoid or elliptical. In such a case, its relative magnetic and electric plane dimensions are considered in the same way as the corresponding dimensions of the rectangular wave guide of Fig. 1.

In the preceding embodiments the invention has been illustrated by means of a single quarter wave transformer section. However, a single step may be replaced by a plurality of smaller steps each proportioned in accordance with the present invention. In Fig. 5 is shown how a rectangular guide 41 is connected and matched to a circular guide 42 by two quarter wave transition guide sections 43 and 44. The intermediate impedance levels $K_0'$ and $K_0''$ of guides 43 and 44, respectively, may be selected with respect to the impedance $K_1$ of guide 41 and $K_2$ of guide 42 in accordance with any of several proportions known to the prior art and described in the above-mentioned textbook by Southworth. In particular, all impedance steps may be linear, the percentage change at each step may be constant resulting in an exponential change, or the steps may be proportioned in accordance with the binomial distribution, maximally flat filter theory, or Tchebycheff polynomials. Having selected the impedance levels $K_0'$ and $K_0''$ in accordance with one of these methods, the principles of the invention are applied to the selection of the dimensions $a_0'$, $b_0'$ of guide 43 and $a_0''$, $b_0''$ of guide 44 as follows. The ratio $K_0'/K_1$ is determined and located on Fig. 2. The coordinates of its intersection with characteristic 26 determine the dimensional ratios of $a_0'/a_1$ and $b_0'/b_1$ which produces a nonsusceptive junction between guides 41 and 43. Then the ratio $K_0''/K_1$ is located on Fig. 2 and the coordinates of its intersection with characteristic 26 employed to determine the dimensional ratio $a_0''/a_1$ and $b_0''/b_1$ for which guide 44 would form a nonsusceptive junction with guide 41. Since, as noted above, two guides each form nonsusceptive junctions with a third guide, they will form a nonsusceptive junction with each other; the junction between guides 43 and 44 will also be nonsusceptive. The principles of the invention may be similarly extended to an arbitrary number of transition sections with the result that commencing with the guide of largest aspect ratio, the aspect ratio of each successive transition section becomes smaller as the wide dimension thereof is decreased and the narrow dimension increases.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A wave guide transformer for effecting transition from a conductively bounded wave guide of circular cross-section of given diameter to a conductively bounded wave guide of rectangular cross-section having a dimension parallel to the magnetic plane of the dominant mode of wave energy propagation therein that is greater than said diameter and a dimension parallel to the electric plane of the dominant mode therein that is less than said diameter, comprising at least one transition section of conductively bounded wave guide connecting said rectangular wave guide to said round wave guide, characterized in that said transition section has a rectangular cross-section that is more nearly square than the cross-section of said rectangular guide to produce a minimum of susceptance and a low Q in junction with said circular guide and with the dimension thereof parallel to said magnetic plane being smaller and the dimension thereof parallel to said electric plane being larger than the correspondingly parallel dimensions of said rectangular guide to produce a minimum of susceptance with said rectangular guide.

2. A wave guide transformer for effecting transition from a first rectangular conductively bounded wave guide for electromagnetic wave energy having an aspect ratio between the cross sectional dimensions thereof parallel to the electric and magnetic planes of the dominant mode of wave energy propagation therein of a first value to a second conductively bounded wave guide having a characteristic impedance and an aspect ratio between the dimensions thereof respectively parallel to said first guide dimensions of a second value different from said first value comprising first and second transition sections of conductively bounded wave guide successively connecting said first and second guides, characterized in that said first transition has a rectangular cross section having an aspect ratio of value nearer said first value than said second value with the dimensions thereof parallel to said first guide dimension being larger and smaller respectively than said parallel dimension of said first guide so that the junction between said guides is substantially non-susceptive, said second transition has a rectangular cross section with both dimensions thereof different from the parallel dimensions of said first transition so that the junction between said first and second transition sections is substantially non-susceptive and also has an aspect ratio of value nearer said second value than said first value and a characteristic impedance equal to said characteristic impedance of said second guide so that the junction between said second transition section and said second section is made at a constant impedance.

References Cited in the file of this patent

UNITED STATES PATENTS

| | | |
|---|---|---|
| 2,432,094 | Fox | Dec. 9, 1947 |
| 2,531,437 | Johnson | Nov. 28, 1950 |
| 2,576,186 | Malter | Nov. 27, 1951 |
| 2,719,274 | Luhrs | Sept. 26, 1955 |
| 2,738,468 | Miller | Mar. 13, 1956 |
| 2,767,380 | Zobel | Oct. 16, 1956 |
| 2,802,183 | Read | Aug. 6, 1957 |

FOREIGN PATENTS

| | | |
|---|---|---|
| 147,078 | Australia | Aug. 10, 1948 |

OTHER REFERENCES

Ragan: Microwave Transmission Circuits, vol. 9, M.I.T. Radiation Lab. Series, McGraw-Hill, 1948, pages 364–69.